Patented Jan. 19, 1943

2,308,588

UNITED STATES PATENT OFFICE 2,308,588

MALEIC ANHYDRIDE PURIFICATION

Joyce H. Crowell, Orchard Park, N. Y., assignor to Allied Chemical & Dye Corporation, a corporation of New York No Drawing. Application June 6, 1941,
Serial No. 396,870

12 Claims. (Cl. 260—343)

This invention relates to purification of maleic anhydride and particularly to a method for refining maleic anhydride produced by catalytic vapor phase oxidation and containing colored and/or color-forming impurities.

In the catalytic vapor phase partial oxidation of organic compounds, such as, for example, benzene, methyl-naphthalene, phenol, cresol, benzophenone, furane, diphenyl, toluene, butene, furfural, and naphthalene, to produce maleic anhydride, various methods for recovering maleic anhydride from the gaseous reaction mixtures resulting from such processes have been employed; for example, the gases have been subjected to controlled preliminary cooling to effect a partial condensation therefrom of maleic anhydride before further treatment of the gases to effect removal of remaining condensible vapors; or the gases have been conducted through an organic solvent to absorb maleic anhydride and the anhydride then has been recovered from the resulting solvent solution, as described in United States Patent 2,140,140; or the gases have been conducted into water to form an aqueous solution of maleic acid from which the acid has been recovered and converted to maleic anhydride by a dehydration process such as that described in United States Patent 1,966,853 or that described in United States Patent 2,205,402. Maleic anhydride recovered by some methods is very dark; that recovered by others is less so; but an attribute common to all such products is the presence therein of colored and/or color-forming impurities.

Hereinafter, in the specification and in the claims, maleic anhydride which contains colored or color-forming impurities to be removed will be termed "crude maleic anhydride," and colored and color-forming impurities will be designated generically by the term "chromogenic impurities."

While it might be presumed that processes applicable to the removal of chromogenic impurities which are present in crude phthalic anhydride obtained from the catalytic vapor phase partial oxidation of organic compounds, e. g., napthalene, should be suitable also for the purification of crude maleic anhydride, such has not been found to be the case. Thus, while a treatment with sulfuric acid at high temperature followed by distillation to recover the purified product has been employed successfully to produce colorless phthalic anhydride products which are surprisingly stable, and remain colorless for long periods of time, the same process when applied to crude maleic anhydride has been found to produce products which are only temporarily colorless.

In my United States Patent 2,129,166 of September 6, 1938, I have described and claimed a process for purifying maleic anhydride by maintaining the anhydride at an elevated temperature for a sufficient time to convert chromogenic impurities to products differing greatly in volatility from the anhydride, and separating the anhydride and reaction products by volatilization. This "aging" process accomplishes an effective purification, but when a product characterized by a commercially acceptable standard of color is required from a not particularly good grade of crude maleic anhydride, it entails heating for so many hours that the process becomes an excessive burden to maintenance of low production costs.

The present invention it in the nature of an improvement over and upon the hot-aging process of my United States Patent 2,129,166.

Objects of the present invention are to provide a more rapid method of purifying crude maleic anhydride than methods hitherto available, and to effect more complete purification of crude maleic anhydride and thereby produce a purified maleic anhydride product distinguished by its unusual stability to the development of color.

In accordance with the present invention, crude maleic anhydride is subjected to a hot-aging in liquid phase in contact with an oxide of boron, or a hydrated oxide of boron, to convert the chromogenic impurities contained in the crude maleic anhydride to products which are relatively non-volatile compared with maleic anhydride, and maleic anhydride is separated from such products by fractional distillation.

The process of the present invention accomplishes the purification of even refractory types of crude maleic anhydride rapidly and at relatively low temperatures, and produces from highly impure and highly colored grades of crude maleic anhydride excellent yields of purified maleic anhydride characterized by excellent color and stability to development of color during storage.

The crude maleic anhydride may be treated either alone in molten condition or in the form of a solution in an organic solvent which is inert to the maleic anhydride and to the reagent employed. As examples of solutions may be mentioned solvent naphtha solutions or chlornaphthalene solutions containing from 50% to 70% by weight of maleic anhydride.

Pressure, aside from its effect upon the boiling point of maleic anhydride, is substantially without effect on the present treatment, and the process may be carried out under superatmospheric, normal, or reduced pressure under otherwise like conditions with substantially identical results.

The mixture of maleic anhydride and purifying reagent may be maintained at the selected treatment temperature until the mixture or a sample thereof brought to its refluxing temperature under the pressure at which the distillation is to be effected, produces a distillate or reflux condensate, the color of which is equal to or better than a desired color standard. The mass then may be subjected to distillation to obtain a very high yield of purified maleic anhydride of the desired color standard. However, the stability of the product towards development of color may be further improved by prolonging the hot-aging period beyond the minimum time required to attain the desired color of distillate. Hence the hot-aging may be regulated to provide the desired degree of stability.

I have found that with otherwise like conditions, to effect a particular degree of purification in a particular mixture of molten maleic anhydride and a purifying reagent of the type hereinbefore described, the necessary period of treatment diminishes as the temperature of treatment is increased.

In general, with other conditions equal, an increase in the amount of the reagent employed permits a reduction in the time required to effect a commensurate purification. On the other hand, with the addition of an amount of solid reagent such as B2O3 greater than 30% of the crude maleic anhydride, it has been found difficult to maintain the mixture as a homogeneous mass; and when such a mixture is distilled, this lack of homogeneity appears to cause an impairment of heat transfer which results in excessive decomposition and loss of yield of refined maleic anhydride.

It is preferable to employ an amount of purifying agent not exceeding about 10% by weight of the crude maleic anhydride.

Examples of suitable compounds for effecting the purification are boric oxide and metaboric and orthoboric acids, which are hydrated boric oxide.

When the crude maleic anhydride to be treated contains free water or maleic acid, the crude product is preferably dehydrated by rectification prior to applying the purification treatment.

The purification treatment of a crude maleic anhydride which contains only a small proportion of chromogenic impurities may be effected by mixing the molten maleic anhydride with the purifying reagent, agitating the mixture for a short time, for example 10 minutes, at a temperature above the melting point of the maleic anhydride, and thereupon distilling the mixture.

However, when the crude maleic anhydride is contaminated by a relatively large content of chromogenic impurities, a short treatment with the purifying reagent may be insufficient to produce more than a small recovery of maleic anhydride exhibiting a commercially acceptable standard of color or stability towards development of color during storage. In such cases, the first part of the distillate may contain excessive proportions of chromogenic impurities, while as the distillation proceeds and thus prolongs the duration of action of the purifying agent on the crude maleic anhydride, more extensive purification takes place and the distillate becomes progressively lighter and in general has a decreasing tendency to develop color during storage. Thus, a late portion of the distillate may be actually satisfactory in color and stability to development of color on standing, but the yield of acceptable maleic anhydride so obtained may be comparatively small. Hence in the treatment of such refractory crude maleic anhydride products the crude is heated in the presence of the purifying reagent for at least three hours and usually considerably longer prior to distillation of maleic anhydride.

A good grade of crude maleic anhydride which is intermingled with a limited quantity of boron oxide can be purified to produce a distillate of a commercial standard of "whiteness" by maintaining the mixture before distillation at a suitable temperature, for example, at 150° C., for substantially less than the time necessary to effect the same degree of decolorization employing an aging treatment in the absence of the boron oxide at the same temperature; and, in general, stability against development of color during storage of the purified maleic anhydride obtained with the aid of the treatment with boron oxide is greater than that of the maleic anhydride purified by the aging treatment without the aid of the boron oxide.

Preferably the aging treatment is conducted at temperatures between 140° C. and 200° C.

The following examples further illustrate the purification process of the present invention. In these examples, deviation from colorlessness of the shade of the purified maleic anhydride in the molten state is expressed in terms of a scale of color standards wherein each color standard bears a number which is synonymous with the shade of a specific dilution of a stock aqueous solution of potassium chlorplatinate and cobalt chloride. The stock solution is prepared by adding 100 cc. of concentrated hydrochloric acid to a solution of 1.246 grams of potassium chlorplatinate (K2PtCl6), corresponding to 0.50 gram of platinum, and 1.00 gram of cobalt chloride hexahydrate (CoCl2.6H2O), corresponding to 0.25 gram of cobalt, in distilled water, and diluting the resulting solution with distilled water to a volume of one liter. The stock solution thus prepared is given a color number of 500 and the remaining color numbers of the scale are ascribed to solutions obtained by specific degrees of dilution of the stock solution as follows:

| Color number | Dilution (parts by volume of distilled water per part of stock solution) |
|---|---|
| 10 | 49 |
| 20 | 24 |
| 40 | 11.50 |
| 60 | 7.30 |
| 80 | 5.25 |
| 100 | 4.00 |
| 150 | 2.33 |
| 200 | 1.50 |
| 300 | 0.67 |
| 400 | 0.25 |
| 500 | 0.00 |

To determine the color number of a purified maleic anhydride, a molten sample of the latter is compared, under substantially identical conditions, with standard solutions which correspond to those identified by the numbers in the foregoing color scale; the number of the solution whose color is most closely approximated by the color of the molten anhydride is said to be the color number of the latter.

In the following examples "parts" signifies parts by weight.

*Example 1*

In the catalytic vapor phase oxidation of benzene by means of air, a crude maleic anhydride product may be obtained by contacting the reaction gases with solvent naphtha. The resulting solvent naphtha solution of maleic anhydride may be fractionally distilled to expel the solvent naphtha and yield a crude maleic anhydride.

To 100 parts of such a crude product 6 parts of boric acid were added and the mixture was heated. The boric acid dissolved and when a temperature of about 135° C. was reached, water vapor came off from the hot mixture; the maleic anhydride began to boil at a temperature between 160° and 170° C. and water was gradually expelled until the boiling point of maleic anhydride was reached. Maleic anhydride was thereupon distilled from the mixture and collected as a substantially colorless product.

A second portion of the same crude maleic anhydride, treated by the same procedure except for omission of boric acid, yielded a deep orange-colored distillate.

*Example 2*

To 100 parts of crude maleic anhydride obtained in the same manner as the anhydride employed in the preceding example, 10 parts of boric anhydride ($B_2O_3$) were added. The mass was refluxed at atmospheric pressure for 30 minutes and then distilled. A substantially colorless distillate was obtained.

By subjecting another portion of the same crude anhydride to the same treatment except for omission of boric anhydride an orange distillate was obtained.

*Example 3*

Crude maleic anhydride obtained by direct partial condensation in the absence of solvents, from the hot reaction gases produced by catalytic air oxidation of benzene was refluxed in a glass still fitted with a reflux condenser until no further water distilled off from the product.

100 parts by weight of the dehydrated crude anhydride were mixed with 1 part by weight of metaboric acid. The mixture was agitated in a glass vessel at 150° to 160° C. at atmospheric pressure for about four hours and then was transferred to a glass distillation flask and fractionally distilled at an absolute pressure of 60 mm. to 70 mm. of mercury. A distillate comprising 75% by weight of the still charge and a distillation residue comprising 25% thereof were obtained. The color of the distillate immediately after distillation and after standing 20 and 50 days was 40, 100, and 100+, respectively.

A control run was conducted using the same type of dehydrated crude anhydride alone but under otherwise like conditions and fractionally distilling the product as described for the metaboric-acid-treated anhydride. The control distillate comprising about 83% by weight of the still charge had a color of 100 which darkened to 300 after only 20 days of standing.

*Example 4*

Boric acid ($H_3BO_3$) in an amount equal to 10% by weight of the dissolved maleic anhydride, is added to a solution of maleic anhydride in solvent naphtha. The mass is refluxed at a temperature between about 120° C. and 130° C. for 30 minutes, during which time any water vapors in the reflux vapors are not condensed but allowed to escape. The mixture is then distilled. The distillate has a color equal to about 3.5 on the Barrett scale. (The Barrett scale consists of a series of fifteen standard color solutions. It is described in the Journal of Industrial and Engineering Chemistry, 1918, vol. 10, page 1008. The color number as obtained above is that of the standard color solution most nearly approximating the color of a sample of the distillate when both distillate and color solution are observed under the same conditions.)

A distillate possessing a color equal to 6.5 (Barrett scale) is produced if the addition of boric acid is omitted.

I claim:

1. In the hot-aging treatment of maleic anhydride wherein a maleic anhydride containing chromogenic impurities is maintained at temperatures above its melting point until chromogenic impurities therein are converted into materials which are separable from the maleic anhydride, the improvement which comprises conducting the hot-aging in the presence of a compound of the group consisting of the oxides and the hydrated oxides of boron.

2. The method of refining maleic anhydride containing chromogenic impurities which distill in the same temperature range as the maleic anhydride, which comprises maintaining the maleic anhydride containing a compound of the group consisting of the oxides and the hydrated oxides of boron, at a temperature between about 140° C. and about 200° C. for a time sufficient to convert such impurities to by-products whose vapor pressure is substantially different from the vapor pressure of maleic anhydride, and separating maleic anhydride from such by-products by fractionation.

3. In the hot-aging treatment of maleic anhydride wherein a maleic anhydride containing chromogenic impurities is maintained at temperatures above its melting point until chromogenic impurities therein are converted into materials which are separable from the maleic anhydride, the improvement which comprises conducting the hot-aging in the presence of a compound of the group consisting of the oxides and the hydrated oxides of boron for at least three hours.

4. In the hot-aging treatment of crude maleic anhydride of the group consisting of maleic anhydride recovered as such from the reaction gases of the vapor phase catalytic oxidation of organic compounds and maleic anhydride obtained by thermal dehydration of maleic acid recovered from such gases, wherein said crude maleic anhydride is maintained at temperatures above its melting point until chromogenic impurities therein are converted into materials which are separable from the maleic anhydride, the improvement which comprises conducting the hot-aging in the presence of boron oxide.

5. In the hot-aging treatment of maleic anhydride wherein a maleic anhydride containing chromogenic impurities is maintained at temperatures above its melting point until chromogenic impurities therein are converted into materials which are separable from the maleic anhydride, the improvement which comprises conducting the hot-aging in the presence of ¼% to 30% by weight of a compound of the group consisting of the oxides of the hydrated oxides of boron.

6. A method of purifying catalytic maleic anhydride containing chromogenic impurities which distill in the same temperature range as the maleic anhydride, which method comprises adding to the impure maleic anhydride between ¼% and 30% by weight of a compound of the group consisting of the oxides and the hydrated oxides of boron at a temperature between about 140° C. and about 200° C. for a period of time at least sufficient to convert said impurities to by-products whose volatility is substantially different from that of maleic anhydride, said period of heating being at least three hours, and separating maleic anhydride from the resulting by-products by vaporization.

7. A method of purifying crude maleic anhydride of the group consisting of maleic anhydride recovered as such from the reaction gases of the vapor phase catalytic oxidation of organic compounds and maleic anhydride obtained by thermal dehydration of maleic acid recovered from such gases, and containing chromogenic impurities which distill in the same temperature range as the maleic anhydride, which method comprises maintaining the maleic anhydride at a temperature of at least about 140° C. but sufficiently low to maintain the bulk of said anhydride in liquid phase in admixture with boron oxide for a period of time at least sufficient to convert said impurities to products having a substantially lower vapor pressure than the aforesaid chromogenic impurities, and distilling off maleic anhydride from said products.

8. A method of purifying crude maleic anhydride of the group consisting of maleic anhydride recovered as such from the reaction gases of the vapor phase catalytic oxidation of organic compounds and maleic anhydride obtained by thermal dehydration of maleic acid recovered from such gases, and containing chromogenic impurities which distill in the same temperature range as the maleic anhydride, which method comprises maintaining the crude molten maleic anhydride in admixture with boron oxide for a period of time at least sufficient to convert said impurities to products having a substantially lower vapor pressure than the aforesaid chromogenic impurities, and distilling off maleic anhydride from said products.

9. The method of purifying crude maleic anhydride containing chromogenic impurities which distill in the same temperature range as the maleic anhydride, which method comprises maintaining the maleic anhydride in admixture with between ¼% and 10% by weight of boron oxide at a temperature between about 140° C. and about 200° C. for a period of time at least sufficient to convert said impurities to products having a substantially lower vapor pressure than the aforesaid chromogenic impurities, and distilling off maleic anhydride from said products.

10. The method of purifying a crude maleic anhydride condensate obtained by fractional condensation of maleic anhydride from hot reaction gases of the vapor phase catalytic oxidation of organic compounds and containing chromogenic impurities which distill from the condensate in the same temperature range as the maleic anhydride, which method comprises treating the maleic anhydride condensate with boron oxide at a temperature between about 140° C. and about 200° C. for a period of time at least sufficient to convert said impurities to products having a substantially lower vapor pressure than the aforesaid chromogenic impurities, said period of heating being at least three hours and distilling off maleic anhydride from said products.

11. The method of purifying a crude maleic anhydride condensate obtained by fractional condensation of maleic anhydride from hot reaction gases of the vapor phase catalytic oxidation of organic compounds and containing chromogenic impurities which distill from the condensate in the same temperature range as the maleic anhydride, which method comprises treating the maleic anhydride condensate with metaboric acid at a temperature between about 140° C. and about 200° C. for a period of time at least sufficient to convert said impurities to products having a substantially lower vapor pressure than the aforesaid chromogenic impurities, and distilling off maleic anhydride from said products.

12. The method of purifying a crude maleic anhydride condensate obtained by fractional condensation of maleic anhydride from hot reaction gases of the vapor phase catalytic oxidation of organic compounds and containing chromogenic impurities which distill from the condensate in the same temperature range as the maleic anhydride, which method comprises treating the maleic anhydride condensate with orthoboric acid at a temperature between about 140° C. and about 200° C. for a period of time at least sufficient to convert said impurities to products having a substantially lower vapor pressure than the aforesaid chromogenic impurities, and distilling off maleic anhydride from said products.

JOYCE H. CROWELL.